Figure 1:
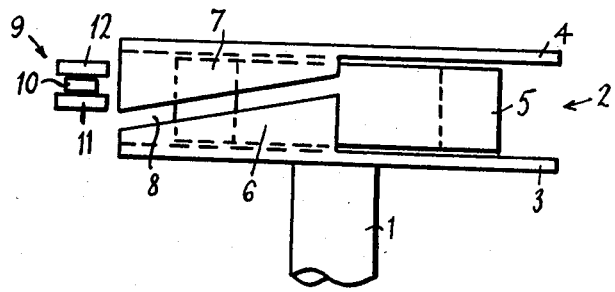

United States Patent
Ayers

[15] 3,681,669
[45] Aug. 1, 1972

[54] MAGNETIC TRANSDUCER

[72] Inventor: Peter John Henry Ayers, Beccles, England

[73] Assignee: Pye Limited, Cambridge, England

[22] Filed: March 22, 1971

[21] Appl. No.: 126,512

[30] Foreign Application Priority Data

April 6, 1970 Great Britain............16,259/70

[52] U.S. Cl..................318/138, 310/36, 310/68 D, 310/70, 310/111, 318/128, 318/254
[51] Int. Cl..............................................H02k 29/00
[58] Field of Search......310/26, 36, 111, 156, 68, 69, 310/70; 318/138, 254, 125, 126, 127, 128, 129, 130, 132, 133; 317/235 H; 58/23

[56] References Cited

UNITED STATES PATENTS

| | | |
|---|---|---|
| 3,549,967 | 12/1970 | Uemura et al..............318/138 |
| 3,331,005 | 7/1967 | Lear et al....................318/254 |
| 3,562,741 | 2/1971 | McEvoy et al............310/111 X |
| 3,491,531 | 1/1970 | Wiesner....................318/132 X |

Primary Examiner—J. V. Truhe
Assistant Examiner—B. A. Reynolds
Attorney—Holcombe, Wetherill & Brisebois

[57] ABSTRACT

A magnetic transducer comprises a magnetic assembly producing a magnetic field varying over a region and a pick-up assembly located in said region and consisting of at least one magnetosensitive semiconductor device having a unidirectional voltage applied to it. Relative movement between the magnetic assembly and the pick-up assembly causes variation of the magnetic field influencing the pick-up assembly and enables a correspondingly variable output signal to be derived from said pick-up assembly.

4 Claims, 5 Drawing Figures

PATENTED AUG 1 1972 3,681,669

MAGNETIC TRANSDUCER

The present invention relates to a magnetic transducer adapted to produce an electrical signal which varies in dependence on the angular position of a member, such as a rotatable shaft. It has particular but not exclusive application to the measurement of the position of a dancer arm in a high-speed winding machine.

An object of the present invention is to provide a transducer, energizable by a unidirectional voltage, which produces a variable unidirectional output signal of magnitude dependent upon the angular position of a rotatable member, such as a shaft, and which imposes virtually no constraint on rotation of the member.

From one aspect the invention provides a magnetic transducer comprising a magnetic assembly producing a magnetic field varying over a region, and a pick-up assembly located in said region and comprising at least one magnetosensitive semiconductor device, whereby relative movement between said magnetic assembly and said pick-up assembly causes variation of the magnetic field influencing said pick-up assembly and enables a correspondingly variable output signal to be derived from said pick-up assembly. The magnetic field varying over the region may be obtained by providing the magnetic assembly with appropriately shaped pole pieces.

Preferably the magnetic assembly is mounted on the rotatable member and the pick-up assembly is fixed, although the reverse arrangement may also be employed.

From another aspect the invention provides a magnetic transducer comprising a magnetic assembly adapted to be secured to and rotate with a rotatable member, and a pick-up assembly mounted in a fixed position adjacent the magnetic assembly so as to be within the magnetic field produced by the magnetic assembly; the magnetic assembly being provided with pole pieces shaped to produce a variation in the magnetic field at the location of the pick-up assembly upon rotation of the member and the pick-up assembly comprising at least one magnetosensitive semiconductor device from which an output signal can be derived which varies in dependence on the angular position of the rotatable member.

In order to derive a satisfactory output signal from the pick-up assembly, the magnetosensitive semiconductor device has a unidirectional voltage applied across it.

In order to compensate for variations in the output signal with variations in ambient temperature, a second magnetosensitive semiconductor device may be connected in series with the first such device and orientated such that the magnetic field of the magnetic assembly traverses it in the reverse direction to that through the first device.

Figure 2:
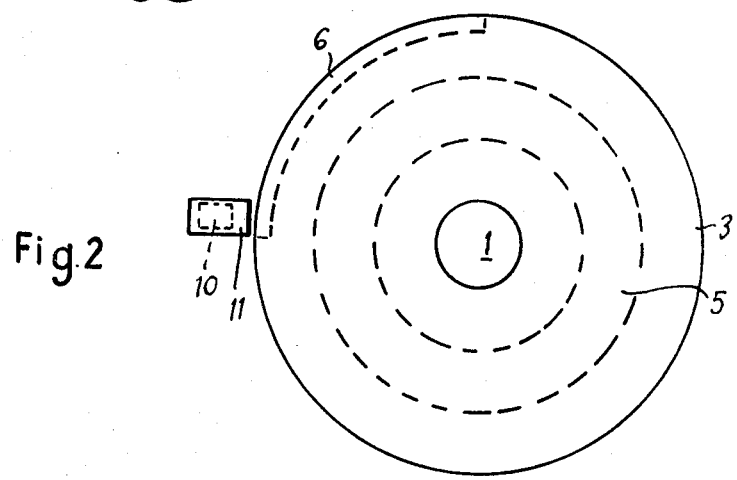
Figure 3:
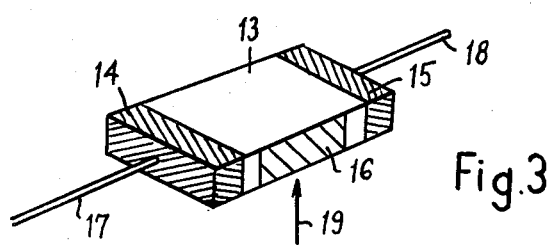
Figure 4:
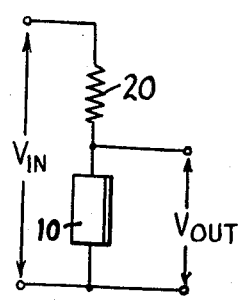
Figure 5:
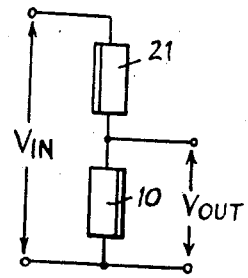

In order that the invention may be more clearly understood, reference will now be made to the accompanying drawings, in which:

FIG. 1 is a side elevational view of one embodiment of transducer according to the invention;
FIG. 2 is a plan view of the transducer;
FIG. 3 is a diagrammatic representation of a magnetodiode;
FIG. 4 is a schematic diagram of one circuit arrangement incorporating the transducer; and
FIG. 5 is a schematic diagram of another circuit arrangement incorporating a modified form of transducer.

Referring to FIGS. 1 and 2, a shaft 1 rotatable through an angle of approximately 90° and whose angular position is to be measured has mounted upon it a magnetic assembly 2 comprising mild steel discs 3 and 4 and an annular magnet 5 secured between and concentric with the discs 3 and 4. Magnet 5 is magnetized so as to have one pole adjacent disc 3 and its other pole adjacent disc 4. A pole piece 6 extends around the circumference of disc 3 through an angle of 90°. This pole piece 6 extends towards disc 4, and its outer face is inclined to the plane of disc 3. A complementary shaped pole piece 7 is provided on the circumference of disc 4, opposite to pole piece 6, the arrangement being such that there exists an air gap 8 of constant width between the pole pieces, the axis of the gap being inclined to a plane normal to shaft 1.

A pick-up assembly 9 comprises a magnetodiode 10 mounted between mild steel pole pieces 11 and 12. Assembly 9 is positioned relative to gap 8 so that with shaft 1 at one limit of its range of rotation, assembly 9 is axially displaced from gap 8 and experiences a relatively weak magnetic field, as shown in FIG. 1. As shaft 1 is rotated, air gap 8 moves relative to assembly 9 until at the other limit of rotation, assembly 9 is symmetrically disposed with respect to gap 8 and the adjacent parts of pole pieces 11 and 12, and the magnetic field experienced by assembly 9 is a maximum.

Magnetodiode 10 is a magnetosensitive semiconductor device which works on the principle of a controlled lifetime of injected carriers by an external magnetic field. Referring to FIG. 3, a magnetodiode comprises a rectangular strip shaped body 13 of substantially intrinsic semiconductor material, having at one end a $P^+$ region 14 and at the other end an $N^+$ region 15. A zone 16 on one side face of body 13 is treated so that recombination of electrons and holes can occur much more rapidly in this zone than in the bulk of body 13. The concentration of carriers (electrons and holes) in body 13 is normally low, and can be appreciably modified by injection. The $P^+$ region 14 contains an excess of holes, while the $N^+$ region 15 has an excess of electrons. If a unidirectional potential V is applied across the device via leads 17 and 18 connected respectively to zones 14 and 25, carriers are injected into body 13. The injected carriers migrate through the body 13 and establish a current I through the magnetodiode. However, the path of each individual carrier through body 13 is irregular in consequence of the collisions it suffers with the atoms of the intrinsic semiconductor material. A fraction of the migrating carriers are so deflected that they impinge on the zone 16, where holes and electrons recombine and are no longer available to contribute to the current I.

If now a magnetic field is applied in the direction of the arrow 19, the carriers traversing body 13 will be deflected towards zone 16. A greater proportion of the injected carriers will therefore recombine than is the case under zero applied magnetic field, and the value of current I will become less. Conversely, if a field is applied in the reverse direction to arrow 19, carriers will be deflected away from zone 16 and the value of I will be greater than its zero field value. For a fixed value of V, the value of I will depend on the magnitude and direction of the applied magnetic field. The magnetodiode therefore behaves as a resistor of value dependent on the applied magnetic field. Magnetodiodes suitable for use in the present invention are available from Sony Corporation.

In the arrangement of FIGS. 1 and 2, the magnetodiode 10 is subjected to a magnetic field which varies with the position of gap 8, i.e. with the angular position of shaft 1. To obtain a unidirectional output signal proportional to the shaft position, the arrangement of FIG. 4 may be adapted. A fixed value resistor 20 is connected in series with magnetodiode 10 and a constant potential $V_{IN}$ is applied across the combination. The potential $V_{OUT}$ appearing across magnetodiode 10 will then depend upon its resistance which is determined by the value the applied magnetic field, which is in turn dependent on the angular position of gap 8 and hence shaft 1.

The arrangement of FIG. 4 gives an output which is liable to change with variation of ambient temperature, since in general resistor 20 and magnetodiode 10 will not have equal temperature coefficients of resistance. The arrangement of FIG. 5 overcomes this disadvantage. A second magnetodiode 21 is connected in series with magnetodiode 10, and is likewise mounted between pole pieces 11 and 12 so that it experiences the same ambient conditions as does magnetodiode 10. Diode 21 is however so orientated that the magnetic field traverses it in the opposite sense to its direction through magnetodiode 10.

The resistances of magnetodiodes 10 and 21 change in opposite senses with change of the applied field. The output signal $V_{OUT}$ is therefore virtually independent of temperature variations and dependent only on the angular position of shaft 1.

Where the transducer is employed to produce an output signal proportional to the position of a dancer arm in a winding machine, the output signal $V_{OUT}$ is suitable for direct connection to a servo system controlling the torque applied to a take-up spindle of the winding machine so as to produce constant tension in the thread. However, the transducer may be used for other purposes in which case the output signal is applied to any desired form of control or indicating arrangement.

Various modifications are possible within the scope of the invention. Thus the angle through which shaft 1 is rotatable may be either greater or less than 90°, the pole pieces 6 and 7 being arranged to extend round discs 3 and 4 respectively through angles at least equal to the angular range of rotation of the shaft.

Although in the embodiment described, shaft 1 rotates through a limited angle, the transducer may be adapted for use with a continuously rotating shaft by arranging that pole pieces 6 and 7 extend completely round discs 3 and 4 respectively. The output signal $V_{OUT}$ will then be a sawtooth waveform, rising steadily from a minimum to a maximum value during each complete revolution of shaft 1 and reverting to its minimum value at the commencement of each successive revolution. Such a transducer may be employed, for example, to determine the total angle through which the shaft has turned since leaving a datum position by counting the number of maxima to give the number of complete revolutions and employing the instantaneous value of the output signal to determine the remaining angle.

I claim:

1. A magnetic transducer comprising a magnetic assembly producing a magnetic field varying over a region and a pick-up assembly located in said region and comprising at least one magnetosensitive semiconductor device, whereby relative movement between said magnetic assembly and said pick-up assembly causes variation of the magnetic field influencing said pick-up assembly and enables a correspondingly variable output signal to be derived from said pick-up assembly, and wherein the magnetic assembly comprises two discs of magnetic material separated by an annular magnet secured between the discs and having one pole adjacent one disc and its other pole adjacent the other disc, a pole piece extending around at least part of the circumference of one disc and extending towards the other disc, a further pole piece extending at least partly around the circumference of the other disc and extending towards the first disc, the pole pieces being so disposed as to provide an air gap between the pole pieces, the axis of the gap being inclined to a plane through the axis of the assembly to provide said magnetic field varying over said region.

2. A transducer as claimed in claim 1, wherein the pick-up assembly comprises a magnetodiode mounted between pole pieces of magnetic material and positioned relative to said air gap so that in one position of rotation of said magnetic assembly, the pick-up assembly is axially displaced from said gap and experiences a relatively weak magnetic field and as the magnetic assembly is rotated the air gap moves relative to the pick-up assembly to a position where the pick-up assembly is more symmetrically disposed with respect to the gap and the magnetic field experienced by the pick-up assembly is greater.

3. A transducer as claimed in claim 2, wherein the pick-up assembly includes a second magnetodiode connected in series with the first magnetodiode and mounted between the pole pieces so that it experiences the same ambient conditions as the first magnetodiode but said second magnetodiode being orientated so that the magnetic field traverses it in opposite sense to its direction through the first magnetodiode whereby the output signal obtained is virtually independent of temperature variations and dependent only on angular position.

4. A transducer as claimed in claim 1, wherein the pole pieces extend completely around the discs and upon rotation of the magnetic assembly, the output signal from the pick-up assembly is a waveform varying between a minimum and a maximum value during each complete rotation of the magnetic assembly.

* * * * *